(12) United States Patent
Fischer (10) Patent No.: US 10,473,753 B2
(45) Date of Patent: Nov. 12, 2019

(54) FILL LEVEL MEASUREMENT DEVICE COMPRISING INTERFERING SIGNAL DETECTION

(71) Applicant: VEGA Grieshaber KG, Wolfach (DE)

(72) Inventor: Michael Fischer, Alpirsbach (DE)

(73) Assignee: VEGA GRIESHABER KG, Wolfach (DE)

( * ) Notice: Subject to any disclaimer, the term of this patent is extended or adjusted under 35 U.S.C. 154(b) by 304 days.

(21) Appl. No.: 15/253,513

(22) Filed: Aug. 31, 2016

(65) Prior Publication Data

US 2017/0059691 A1 Mar. 2, 2017

(30) Foreign Application Priority Data

Sep. 1, 2015 (EP) ..................................... 15183359

(51) Int. Cl.
*G01S 7/02* (2006.01)
*G01F 23/284* (2006.01)

(52) U.S. Cl.
CPC ............ *G01S 7/023* (2013.01); *G01F 23/284* (2013.01)

(58) Field of Classification Search
CPC .... G01F 22/00; G01F 23/284; G01F 25/0061; G01S 13/88; G01S 7/023; G01S 7/292; G01S 7/354
USPC .......................................................... 342/16
See application file for complete search history.

(56) References Cited

U.S. PATENT DOCUMENTS

| 5,973,636 A | * | 10/1999 | Okubo | .................... G01S 7/032 342/109 |
| 7,145,349 B1 | | 12/2006 | Cramer et al. | |
| 2003/0214430 A1 | * | 11/2003 | Husted | .................... G01S 7/021 342/57 |
| 2005/0179584 A1 | * | 8/2005 | Ohlsson | ................ G01F 23/284 342/124 |
| 2006/0012512 A1 | * | 1/2006 | Jirskog | ................. G01F 23/284 342/124 |
| 2007/0186678 A1 | * | 8/2007 | Griessbaum | .......... G01F 23/284 73/861 |

(Continued)

FOREIGN PATENT DOCUMENTS

| CN | 1437700 A | 8/2003 |
| CN | 1535374 A | 10/2004 |

(Continued)

OTHER PUBLICATIONS

Chinese Office Action in counterpart Chinese application, dated Jul. 11, 2019, (10 pages).

*Primary Examiner* — Timothy A Brainard
(74) *Attorney, Agent, or Firm* — Oblon, McClelland, Maier & Neustadt, L.L.P.

(57) ABSTRACT

A fill level measurement device is provided, including a transmission branch configured to generate and emit a transmission signal towards a filling material surface; and a receiving branch configured to receive and evaluate a received signal, wherein the fill level measurement device is configured to selectively assume an interfering signal detection mode for detecting whether the received signal comprises an interfering signal, and a fill level measurement mode for measuring the fill level, and wherein the transmission signal has a lower intensity in the interfering signal detection mode than in the fill level measurement mode.

10 Claims, 4 Drawing Sheets

(56) References Cited

U.S. PATENT DOCUMENTS

| | | | |
|---|---|---|---|
| 2007/0188374 A1* | 8/2007 | Fehrenbach | G01F 23/284 342/124 |
| 2009/0085795 A1 | 4/2009 | Fehrenbach et al. | |
| 2010/0052974 A1 | 3/2010 | Corbe et al. | |
| 2010/0225524 A1* | 9/2010 | Szajnowski | G01R 23/02 342/98 |

FOREIGN PATENT DOCUMENTS

| | | |
|---|---|---|
| CN | 101322015 A | 12/2008 |
| CN | 101666668 a | 3/2010 |
| CN | 102200464 A | 9/2011 |
| DE | 42 07 627 A1 | 9/1993 |
| DE | 42 07 627 C2 | 12/1993 |
| DE | 19 949 992 A1 | 5/2001 |
| DE | 10 2005 057 094 B4 | 2/2013 |
| EP | 2 161 551 A1 | 3/2010 |

\* cited by examiner

FILL LEVEL MEASUREMENT DEVICE COMPRISING INTERFERING SIGNAL DETECTION

FIELD OF THE INVENTION

The invention relates to fill level measurement. The invention relates in particular to a fill level measurement device having an interfering signal detection mode, to a method for preventing a fill level radar being affected by interference, to a program element and to a computer-readable medium.

BACKGROUND

Fill level measurement devices, and in particular fill level radar devices, emit a transmission signal towards the filling material surface, which reflects said signal. The transmission signal, referred to in the following as the received signal, reflected by the filling material surface can then be evaluated by the fill level measurement device. As part of this evaluation, the fill level can be determined from the fill level echo contained in the received signal, which echo is the signal component of the transmission signal that has been reflected by the filling material surface.

Depending on the intensity of the emitted transmission signal, the nature of the filling material surface and additional parameters, such as the existence of interfering signals, the measurement accuracy can be adversely affected.

These effects which reduce the measurement accuracy can be remedied by suitably designing the receiving antenna, the electronics system associated with signal generation and signal processing, and the provision of shields which prevent interfering signals reaching the receiving antenna.

These measures are sometimes complex and do not always lead to the desired result.

SUMMARY OF THE INVENTION

A first aspect of the invention relates to a fill level measurement device, in particular a fill level radar measurement device, comprising a transmission branch and a receiving branch. The transmission branch is used to generate and emit a transmission signal towards the filling material surface. In order to emit the transmission signal, the transmission branch can comprise an antenna that radiates the transmission signal towards the filling material surface. The receiving branch is used to receive and subsequently evaluate the reflected transmission signal (i.e. the received signal).

The fill level measurement device is designed to selectively assume an interfering signal detection mode and a fill level measurement mode. In the interfering signal detection mode, the fill level measurement device can detect whether the received signal comprises an interfering signal. The fill level is not measured in this mode. The measurement device can measure the fill level in the fill level measurement mode. In this case, the transmission signal emitted in the interfering signal detection mode has a lower intensity than the transmission signal emitted in the fill level measurement mode.

In other words, the intensity of the transmission signal is reduced when the device switches from the fill level measurement mode into the interfering signal detection mode (and vice versa).

For example, the intensity of the transmission signal is zero in the interfering signal detection mode. In this case, the transmission signal is therefore deactivated in the interfering signal detection mode, for example by disconnecting the transmission branch.

If an interfering signal is now detected in the interfering signal detection mode, said signal can be taken into consideration when calculating the fill level. Alternatively or in addition, when the fill level measurement device has detected an interfering signal in the interfering signal detection mode, said device can change the transmission and receiving channel of the transmission and received signal, respectively, when in the fill level measurement mode. This can prevent the interfering signal influencing the fill level measurement.

For example, a variable filter is provided that is arranged in the receiving branch of the fill level measurement device and is adapted to the transmission and receiving channel currently in use.

A variable attenuator can also be provided that is arranged in the transmission branch and increases the attenuation of the transmission signal in order for the interfering signal detection mode to be assumed.

It is also possible to arrange a booster or amplifier in the transmission branch, which is deactivated in order for the interfering signal detection mode to be assumed, such that the intensity of the transmission signal significantly reduces or even reaches zero.

If the intensity reaches zero, only interfering signals from external sources of interference are still detected in the interfering signal detection mode. These external sources of interference are devices which broadcast in the same frequency band, for example other fill level measurement devices.

By changing the transmission and receiving channel, this interference can be reduced or even completely eliminated. As a result, the quality of the fill level measurement is increased.

According to another embodiment of the invention, the fill level measurement device is designed to cyclically switch between the interfering signal detection mode and the fill level measurement mode. Said device therefore regularly checks whether the received signal comprises interfering signals. If so, the transmission and receiving channel can be automatically changed.

According to another embodiment of the invention, the fill level measurement device comprises a switch which disconnects the transmission branch in order for the interfering signal detection mode to be assumed. This is an effective means for switching from the fill level measurement mode to the interfering signal detection mode, since the switch simply needs to be flicked and no other changes need to be made in the electronics system.

It is also possible for a combination of the above-described measures to be provided, for example the simultaneous provision of a variable filter and a variable attenuator, or a variable filter and a booster.

According to another embodiment of the invention, the fill level measurement device comprises a data memory, in which a reference echo curve that does not comprise an interfering signal component is stored. The fill level measurement device is designed to compare the received signal detected in the interfering signal detection mode with the reference echo curve, in order to decide whether the received signal comprises an interfering signal or not.

Another aspect of the invention relates to a method for preventing a fill level radar being affected by interference from other fill level radar devices. A transmission signal is first generated and emitted towards a filling material surface.

This signal is reflected by the filling material surface and the corresponding received signal is received and evaluated by the fill level radar. The fill level radar first assumes an interfering signal detection mode in order to detect whether the received signal comprises an interfering signal. In this case, the intensity of the transmission signal is lower in the interfering signal detection mode than in the fill level measurement mode. If an interfering signal is detected, the fill level measurement device changes the transmission and receiving channel and checks whether there is also any interference in the newly selected channel. If the newly selected channel is free from interference, the fill level measurement device switches to the fill level measurement mode to measure the fill level. As already mentioned, the intensity of the transmission signal is higher in the fill level measurement mode than in the interfering signal detection mode.

Another aspect of the invention provides a program element which, when executed on the processor of a fill level measurement device, instructs the fill level measurement device to carry out the method steps described above and below.

Another aspect of the invention relates to a computer-readable medium, on which the above-described program element is stored.

Embodiments of the invention will be described in the following with reference to the figures. Where the same reference numerals are used in the following description of the figures, they denote the same or similar elements. However, the same or similar elements may also be denoted by different reference numerals.

DETAILED DESCRIPTION OF EMBODIMENTS

Figure 1:
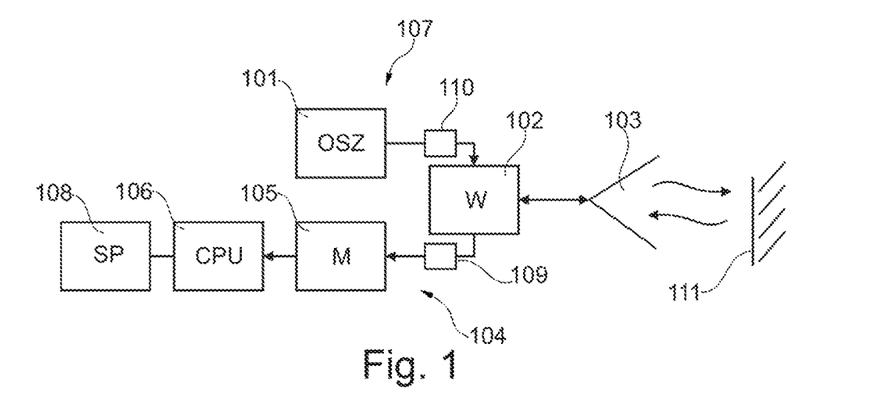
FIG. 1 shows the transmission and receiving branch of a fill level measurement device according to an embodiment of the invention.

FIG. 1 is a simplified block diagram of the high-frequency part of a fill level radar. Together with the rapid increase in the number of wireless applications over the past few years, which use part of the frequency spectrum for their own purposes, be it for communication or other purposes such as distance measurement, the potential of the devices to affect one another has also increased. Since there are only so many usable frequency bands, an increasing number of devices have to share the frequency spectrum available.

Therefore, a frequency range of from 76 to 77 GHz, for example, is assigned to applications in the motor vehicle sector. This frequency range is for example used by motor vehicle radar sensors for distance warning or as part of an adaptive speed control system (ACC, adaptive cruise control). This frequency range overlaps with the frequency range of from 75 to 85 GHz available outdoors for fill level measurement. Coexistence of the two systems in the same frequency band, without said systems affecting one another, would be very desirable.

Furthermore, it is desirable to be able to use a plurality of radar sensors for measuring the fill level in a small space, which sensors broadcast in the same frequency band without being affected by the radar signals of the adjacent devices. In particular, in the case of a plurality of radar sensors in the same container, it has to be expected that the devices interfere with one another.

The way in which a radar sensor for fill level measurement is affected by signals from other transmitters which use the same frequency band can be recognised and how suitable measures can be taken to firstly enable the systems to coexist and to secondly ensure as interference-free operation of the fill level sensor as possible will be described in the following.

In order to make the radar sensor for fill level measurement more robust against interference from other devices that broadcast in the same frequency band, methods and circuit arrangements are proposed, the basic principle of which is shown by the block diagram in FIG. 1.

A transmission oscillator 101 generates a transmission signal, which reaches the antenna 103 via a duplexer 102 and is emitted towards a filling material. The above-described part of the fill level measurement device will also be referred to as the transmission branch 107 in the following.

A variable attenuator 110 can be arranged in the transmission branch 107 and increases the attenuation of the transmission signal in order for the interfering signal detection mode to be assumed, such that the intensity of the transmission signal is lower than in the fill level measurement mode.

The signal reflected by the filling material surface 111 returns to the antenna 103, is received thereby and reaches the receiving branch 104 via the duplexer 102. The received radar signal is downmixed to a low-frequency signal in the receiving mixer 105.

In the signal processing block 106 connected to the receiving mixer 105, the downmixed received signal is lastly amplified, filtered and digitised and the echo curve is generated and evaluated. A variable filter 109 can be arranged between the duplexer 102 and the mixer 105 and is adapted to the transmission and receiving channel currently in use. The filter 109 can also be arranged between the duplexer 102 and the antenna 103. In order to increase the selectivity between the channels provided, filtration preferably takes place before downmixing in the mixer 105.

Unwanted signals from other devices can, however, also be received and processed by the antenna 103 and can cause interference in the receiving branch 104. In general, unwanted received signals originating from other users have an effect on the echo curve of the fill level sensor, which curve is prepared and evaluated in the signal processing block 106.

The signal processing block 106 can be connected to a memory element 108, on which a reference echo curve to which the signal processing block has access is stored for example.

In general, two scenarios can be distinguished. On the one hand, unwanted received signals can raise the noise level present in the echo curve. This effect can be seen in several cases. On the other hand, received signals from other users can less frequently lead to unwanted echoes in the echo curve, which have nothing to do with the fill level to be measured.

The increased noise level leads to a reduction in the sensitivity of the radar sensor and the unwanted echoes can, for example, lead to an incorrect echo decision and therefore to an incorrect measurement value being output. During operation, these anomalies in the echo curve cannot be reliably recognised. In addition to the interfering signals from other users in the frequency spectrum, an increase in the noise level can also be caused by other factors. An increase in the noise level in a scenario in which there are several echoes in the echo curve (e.g. spurious echoes from tank fixtures or multiple echoes in the tank) often cannot be reliably recognised either.

So as to be able to reliably recognise the indicators of unwanted received signals from other users in the frequency band, the transmission branch 107 in FIG. 1 is switched off and only the receiving branch 104 is operated. If the transmission branch 107 is switched off, the radar signal no longer sends radar signals. It is therefore possible to monitor the channel used, without the resulting echo curve being superimposed by fill level echoes (from its own device). In this case, all averaging activity in the signal processing block 106 should be stopped. In particular, averaging the echo curve can prevent reliable detection of interference that only occurs either sporadically or rarely.

If anomalies are spotted in the thus resulting echo curve, these can be attributed to received signals from other users. If the disturbances in the echo curve are too large, i.e. if for example, the increase in the noise level is too high in comparison with the interference-free echo curve, it is possible to first switch to another channel in the receiving branch. The same applies to unwanted echoes in the echo curve. The interference-free echo curve is, for example, measured in the factory during production of the fill level sensor and is stored in the memory of the sensor.

Figure 2A:
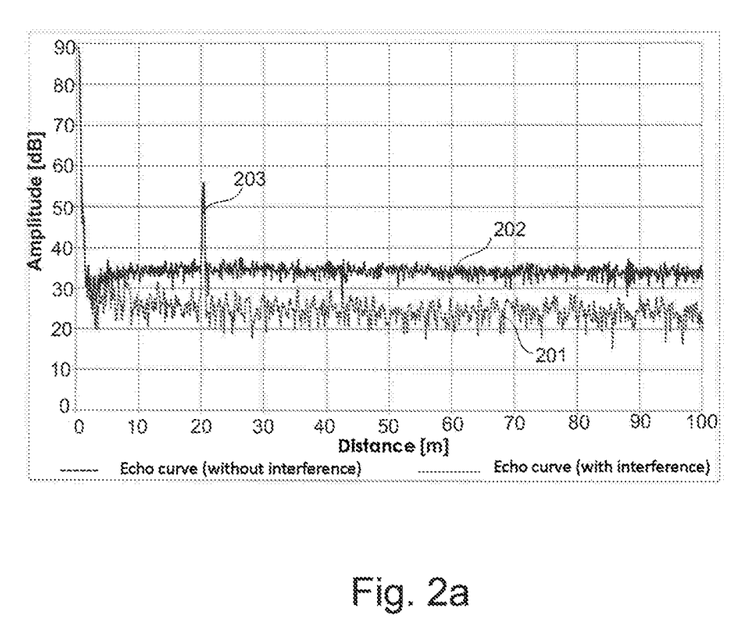
FIG. 2a shows an echo curve in the fill level measurement mode having superimposed interference and an echo curve in the fill level measurement mode not having superimposed interference.

FIG. 2a shows, on the basis of an example, the effects of an interfering signal on the echo curve of a radar sensor for measuring the fill level. The curve 201 is an interference-free echo curve having a fill level echo 203 approximately 20 m away from the measurement device. The echo curve 202 results from the curve 201 when the sensor is affected by an external interfering signal in the channel used. It is possible in this case to clearly recognise the increase in the noise level of the curve by approximately 10 decibels over the entire measurement range. Similarly, the signal-to-noise ratio of the remaining fill level echo 203 is also reduced. It would still be readily possible in this example to measure the fill level using the curve 202. However, under unfavourable fill level measurement conditions, the increase in noise level caused by the interference could mask the remaining fill level echo 203. The sensor would then no longer be able to measure a correct fill level.

Figure 2B:
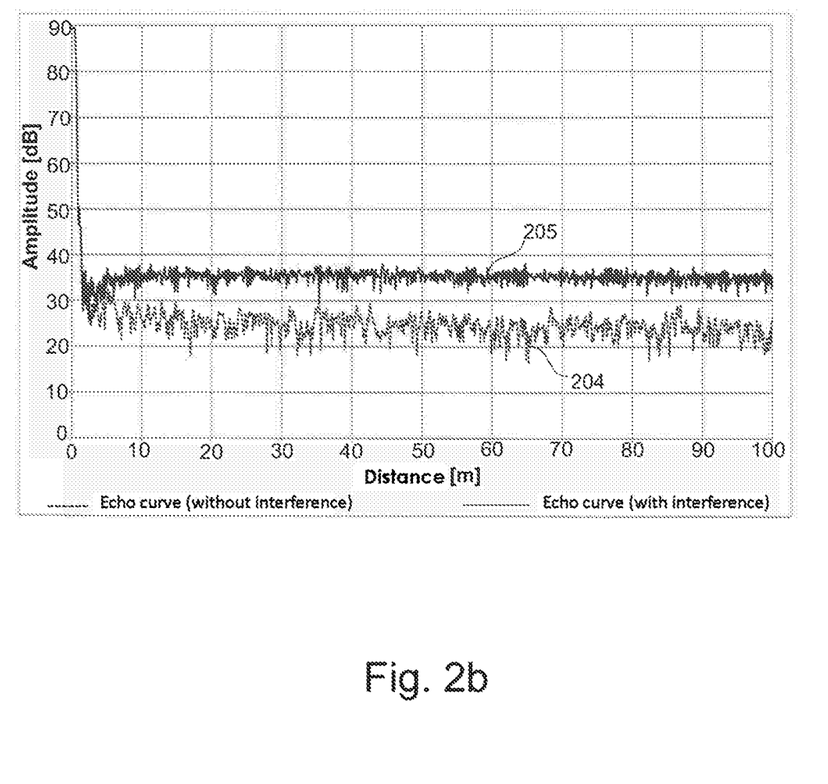
FIG. 2b shows an echo curve in the interfering signal detection mode having superimposed interference and an echo curve in the interfering signal detection mode not having superimposed interference.

FIG. 2b shows an interference-free echo curve 204 that is stored in the memory 108 of the fill level sensor and has been recorded with the transmission branch deactivated, but without an interfering signal. The echo curve 205 results when the transmission branch is switched off and when there is an externally supplied interfering signal in the monitored channel again. The increase in noise clearly visible in the curve 205 can, however, be readily recognised by processing the signal using the stored interference-free curve 24.

Prior to the actual fill level measurement for example, the current usability of the entire available spectrum, i.e. all the available transmission/receiving channels, or only individual channels or parts of the spectrum, can first be checked. If a channel free of interference is found, the transmission branch 107 is switched on and the actual fill level measurement can begin. In order to increase the selectivity between the individual channels, an adaptable filter 109, which is adapted to the channel used in each case, can be inserted into the connection between the duplexer 102 and the receiving mixer 105 or into the connection between the duplexer 102 and the antenna 103.

The usability of the channel used can also be cyclically checked during the fill level measurement. For this purpose, the fill level measurement is briefly interrupted by the transmission branch 107 being switched off again. If no anomalies are spotted in the resultant echo curve, the transmission branch 107 is switched back on and measurement of the fill level is continued. If disturbances are spotted in the echo curve, it is possible, for example, to switch to another interference-free transmission and receiving channel.

The frequency ranges assigned by the regulatory authorities for measuring the fill level using radar are generally large enough to be divided into a plurality of usable channels. Radar devices which are simultaneously operated in the immediate vicinity of one another can utilise this for measuring the fill level by selecting different channels if interference occurs.

The adjacent radar devices can communicate with one another and inform one another which channels they intend to use, so that, even before the measurement has started, channels can be selected which are not used by adjacent devices, so as to minimise interference.

As a result, the number of interfering signal measurements (each followed by switching to another channel) can be reduced, since a channel already occupied by an adjacent device cannot actually be selected by the particular device in the first place.

A basic consideration of the invention is to use a radar device for measuring the fill level to monitor a frequency spectrum for possible disturbances by other users of the spectrum in question. Monitoring is carried out by switching off the transmission branch or down-regulating the transmission signal in the fill level radar (interfering signal detection mode) and by subsequently evaluating the echo curve for possible irregularities, such as the increase in the noise level or the appearance of interfering echoes.

Different radar methods can be used to measure the fill level. On the one hand, a pulsed radar method is known, in which very short radar pulses are sent and are sampled once again in the receiving mixer in a sequential sampling method. On the other hand, the frequency-modulated continuous wave radar (FMCW) can be used to measure the fill level. The method described here for preventing interference from other users in the spectrum is, however, not restricted to a specific radar method or a specific type of modulation. Rather, the method described here can be used in all radar methods and types of modulation used for measuring the fill level.

Figure 3:
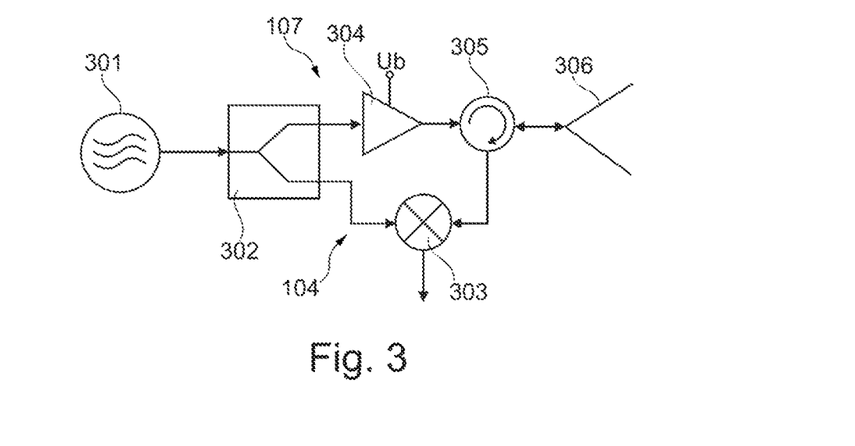
FIG. 3 is a simplified block diagram of the high-frequency part of an FMCW radar sensor according to an embodiment of the invention.

FIG. 3 is a simplified block diagram of the high-frequency part of an FMCW radar sensor. The voltage-controlled oscillator (VCO) 301 generates a frequency-modulated signal (e.g. a linear frequency ramp having the start frequency $f_1$ and the end frequency $f_2$), which signal is divided in the power divider 302 into an LO (local oscillator) signal for the mixer 303 and a transmission signal that reaches the antenna 306 by means of the booster 304 and the circulator 305 and is emitted there.

The signal reflected by the filling material returns to the antenna 306, is received thereby and forwarded to the mixer 303 via the circulator 305. By means of the LO signal, the received signal is downmixed in the mixer 303 into a low-frequency signal so that additional processing can take place. In order to monitor the transmission/receiving channel intended for the fill level measurement, the booster 304, for example, can be switched off in the circuit in FIG. 3. This can, for example, be done by disconnecting the booster from the supply voltage $U_b$. If the supply voltage is taken up by the booster 304, said component generally attenuates the applied input signals to a very considerable extent. Therefore none of the transmission signals, or only those that have been considerably weakened, reach the antenna. As a result, the signals are preferably attenuated at least to the extent that the echoes become imperceptible in the background noise of the receiving branch after being reflected by the filling material surface. Therefore, interference-free monitoring of the channel used is possible.

However, nothing is changed on the LO signal for the mixer 303 by switching off the booster 304, and therefore the channel defined by the frequencies $f_1$ and $f_2$ of the frequency ramp can be monitored. If, in this process, interference is now detected in the echo curve, for example as a result of an increase in the noise level, a new channel can be selected. This is done by newly selecting the start and end frequency of the frequency ramp used for measuring the fill level.

The newly selected channel and the originally interrupted channel should preferably not overlap. If a channel free of interference is found, the supply voltage $U_b$ of the booster 304 is switched back on and the fill level measurement is commenced or continued. It is, in general, very simple to freely select the start and end frequencies $f_1$ and $f_2$ of the frequency ramp in FMCW radar, since the VCO is usually controlled in a phase-locked loop. The selection of $f_1$ and $f_2$ can therefore be attributed to the programming of the PLL (phase-locked loop) component and is always possible both prior to the actual fill level measurement and during operation of the radar sensor.

In order to increase the selectivity between the individual channels, a filter can also be inserted into the connection between the circulator 305 and the mixer 303 or into the connection between the circulator 305 and the antenna 306, which filter is adapted to the channel used in each case.

In place of or in addition to the booster 304, a variable attenuator can also be used for example at the same point (or in front of/behind said point). When monitoring the desired channel, very high attenuation can be wired into the transmission branch by means of the attenuator, such that no signals, or only those signals that have been considerably weakened, reach the antenna. If a channel free of interference is found, the high attenuation in the transmission branch is removed again and the fill level measurement can be continued.

Figure 4:
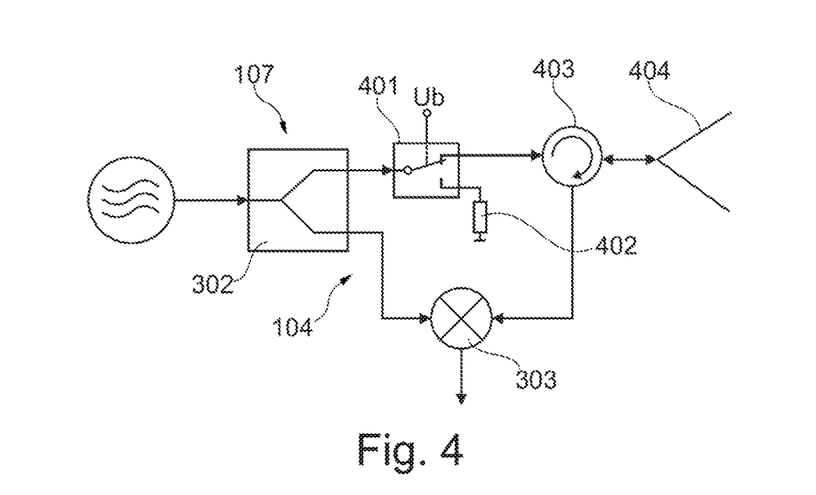
FIG. 4 is a simplified block diagram of the high-frequency part of an FMCW radar sensor according to another embodiment of the invention.

FIG. 4 shows another embodiment of an FMCW radar sensor. In this case, the transmission branch is switched off by means of a switch 401. The switch 401 has two positions and can be controlled for example by the voltage $U_b$. One position of the switch is such that the input signal of the switch is forwarded to the circulator 403 and then to the antenna 404, as shown in FIG. 4.

In order to monitor the channel, the switch 401 is flicked such that the input signal of the switch is forwarded to the reflection-free terminating resistor 402. As a result, the transmission signals are preferably also weakened in this case to the extent that the echoes become imperceptible in the background noise of the receiving branch after being reflected by the filling material surface. If a channel free of interference is found, the switch is flicked again such that the transmission signals can return to the antenna and the fill level measurement can be continued.

Figure 5:
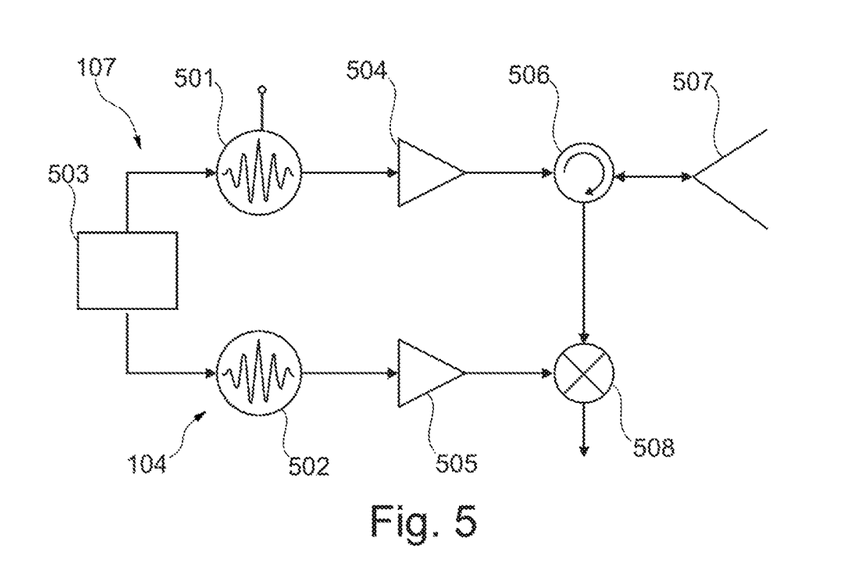
FIG. 5 is a simplified block diagram of the high-frequency part of a pulsed radar for fill level measurement according to another embodiment of the invention.

FIG. 5 is a simplified block diagram of the high-frequency part of a pulsed radar for measuring the fill level. The pulse oscillator 501 generates short radar pulses which reach the antenna 507 by means of the booster 504 and the circulator 506 and are emitted there. The signal reflected by the filling material returns to the antenna 507, is received and forwarded to the sampling mixer 508 via the circulator 506. The sampling pulses are generated in the pulse oscillator 502 and reach the mixer 508 via the booster 505. Here, by means of the sampling pulses, the received signal applied to the mixer 508 is converted into a low-frequency signal by sequential sampling. The two pulse oscillators 501 and 502 are synchronised in the synchronisation circuit 503.

The circuit in FIG. 5 has a separate transmission oscillator 501. By switching off said oscillator 501, for example by disconnecting its supply voltage $U_b$, it is possible to deactivate the transmission signal in a very simple manner. Therefore, interference-free monitoring of the channel used is in turn possible. It is lastly possible to change channels by modifying the centre frequency of the radar pulses used in the frequency band available. In order to increase the selectivity between the individual channels, a filter can also be inserted in this case into the connection between the circulator 506 and the sampling mixer 508 or into the connection between the circulator 506 and the antenna 507, which filter in turn has to be adapted to the channel used in each case.

Even in modern, integrated radar transceivers mounted on a single chip as monolithic microwave integrated circles (MMIC), the transmission branch(es) can be switched off as required. Therefore, it is also possible to monitor the channel for unwanted interference in these components.

For completeness, it should also be noted that "comprising" and "having" do not exclude the possibility of other elements or steps, and "a" or "an" does not exclude the possibility of a plurality. It should also be pointed out that features or steps that have been described with reference to one of the above embodiments can also be used in combination with other features or steps of other embodiments described above. Reference numerals in the claims should not be treated as limiting.

The invention claimed is:
1. A fill level measurement device, comprising:
a transmission branch configured to generate and emit a transmission signal towards a filling material surface; and
a receiving branch configured to receive and evaluate a received signal,
wherein the fill level measurement device is configured to selectively assume an interfering signal detection mode, in which no or a low intensity transmission signal is emitted to receive and detect an interfering signal emitted from an adjacent fill level measurement device, and a fill level measurement mode, in which a higher intensity transmission signal is generated and emitted to measure the fill level, the emitted no or low intensity transmission signal having a lower intensity in the interfering signal detection mode than the emitted higher intensity transmission signal in the fill level measurement mode, and wherein the fill level measurement device is further configured to change a transmission and receiving channel when the fill level measuring device has detected the interfering signal in the interfering signal detection mode, such that the transmission signal is generated and emitted in a different frequency range.

2. The fill level measurement device according to claim 1, wherein the transmission signal of the transmission branch is deactivated in the interfering signal detection mode.

3. The fill level measurement device according to claim 1, further comprising:
a variable filter disposed in the receiving branch and being adapted to the transmission and receiving channel currently in use.

4. The fill level measurement device according to claim 1, further comprising:
a variable attenuator disposed in the transmission branch and being configured to increase an attenuation of the transmission signal of the transmission branch in order for the interfering signal detection mode to be assumed.

5. The fill level measurement device according to claim 1, further comprising:
an amplifier disposed in the transmission branch and being configured to deactivate in order for the interfering signal detection mode to be assumed.

6. The fill level measurement device according to claim 1, wherein the fill level measurement device is further configured to cyclically switch between the interfering signal detection mode and the fill level measurement mode.

7. The fill level measurement device according to claim 1, further comprising:
a switch configured to disconnect the transmission branch in order for the interfering signal detection mode to be assumed.

8. The fill level measurement device according to claim 1, further comprising:
a data memory storing a reference echo curve,
wherein the fill level measurement device is further configured to compare the received signal detected in the interfering signal detection mode with the reference echo curve, in order to decide whether the received signal is the interfering signal.

9. A method for preventing a fill level radar from being affected by interference from another device, comprising:
generating and emitting a transmission signal towards a filling material surface;
receiving and evaluating a received signal;
selectively assuming an interference signal detection mode, in which no or a low intensity transmission signal is emitted to receive and detect whether the received signal comprises an interfering signal emitted from said another device, and a fill level measurement mode, in which a higher intensity transmission signal is generated and emitted to measure the fill level, the emitted no or low intensity transmission signal having a lower intensity in the interference signal detection mode than the emitted higher intensity transmission signal in the fill level measurement mode; and
changing a transmission and receiving channel when the fill level radar has detected the interfering signal in the interfering signal detection mode, such that the transmission signal is generated and emitted in a different frequency range.

10. A nontransitory computer-readable storage medium having stored therein a program, which when executed on a processor of a fill level measurement device, instructs the fill level measurement device to perform steps comprising:
generating and emitting a transmission signal towards a filling material surface;
receiving and evaluating a received signal;
selectively assuming an interference signal detection mode, in which no or a low intensity transmission signal is emitted to receive and detect whether the received signal comprises an interfering signal emitted from said another device, and a fill level measurement mode, in which a higher intensity transmission signal is generated and emitted to measure the fill level, the emitted no or low intensity transmission signal having a lower intensity in the interference signal detection mode than the emitted higher intensity transmission signal in the fill level measurement mode; and
changing a transmission and receiving channel when the fill level measurement device has detected the interfering signal in the interfering signal detection mode, such that the transmission signal is generated and emitted in a different frequency range.

* * * * *